United States Patent
Nyshadham et al.

(10) Patent No.: US 9,672,337 B2
(45) Date of Patent: Jun. 6, 2017

(54) DYNAMIC AUTHENTICATION

(71) Applicant: Verizon Patent and Licensing Inc., Basking Ridge, NJ (US)

(72) Inventors: Shiva Rama Krishna Nyshadham, Hyderabad (IN); Viraj C. Mantri, Mumbai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 6 days.

(21) Appl. No.: 14/682,311

(22) Filed: Apr. 9, 2015

(65) Prior Publication Data

US 2016/0300045 A1    Oct. 13, 2016

(51) Int. Cl.
*G06F 21/00* (2013.01)
*G06F 21/31* (2013.01)

(52) U.S. Cl.
CPC .................................... *G06F 21/31* (2013.01)

(58) Field of Classification Search
CPC .................................. G06F 21/31; G06F 21/86
USPC .................. 726/19, 2, 16, 17, 26, 27, 28
See application file for complete search history.

(56) References Cited

U.S. PATENT DOCUMENTS

| | | | | |
|---|---|---|---|---|
| 2002/0087894 A1* | 7/2002 | Foley | .................... | H04L 63/083 726/4 |
| 2007/0255953 A1* | 11/2007 | Peyret | ...................... | H04L 9/32 713/168 |
| 2008/0294715 A1* | 11/2008 | Kanevsky | ........... | G06F 21/6263 |
| 2009/0320124 A1* | 12/2009 | Taxier | ..................... | G06F 21/36 726/17 |
| 2013/0205387 A1* | 8/2013 | Le | .......................... | G06F 21/316 726/19 |
| 2014/0215601 A1* | 7/2014 | Rittle | ..................... | G06F 21/36 726/16 |
| 2016/0119386 A1* | 4/2016 | Le Rouzic | ............ | H04L 65/104 709/229 |
| 2016/0132673 A1* | 5/2016 | Birk | ........................ | G06F 21/36 726/19 |

* cited by examiner

*Primary Examiner* — Sarah Su

(57) ABSTRACT

A method, a device, and a non-transitory storage medium having instructions to randomly select a file that provides a mnemonic for a user input; present the file; receive a user input that is responsive to a presentment of the file; determine whether the user input is correct; and grant further access and use of a device based on a determination that the user input is correct, wherein when the user input is correct, the user is authenticated.

20 Claims, 11 Drawing Sheets

DYNAMIC AUTHENTICATION

BACKGROUND

A device, such as a mobile device, offers various services and applications to its user, such as a media service, a communication service, a navigation service, a business application, and web browsing. Additionally, users may store personal or sensitive information on the device. Accordingly, the device may provide various security services that aid the user in securing information stored on or accessible via the device. For example, the device may present an authentication screen that prompts the user to enter a password before access and use of the device is permitted. Alternatively, the device may include a biometric-based security service that authenticates the user before access and use of the device is permitted.

DETAILED DESCRIPTION OF PREFERRED EMBODIMENTS

Figure 1:
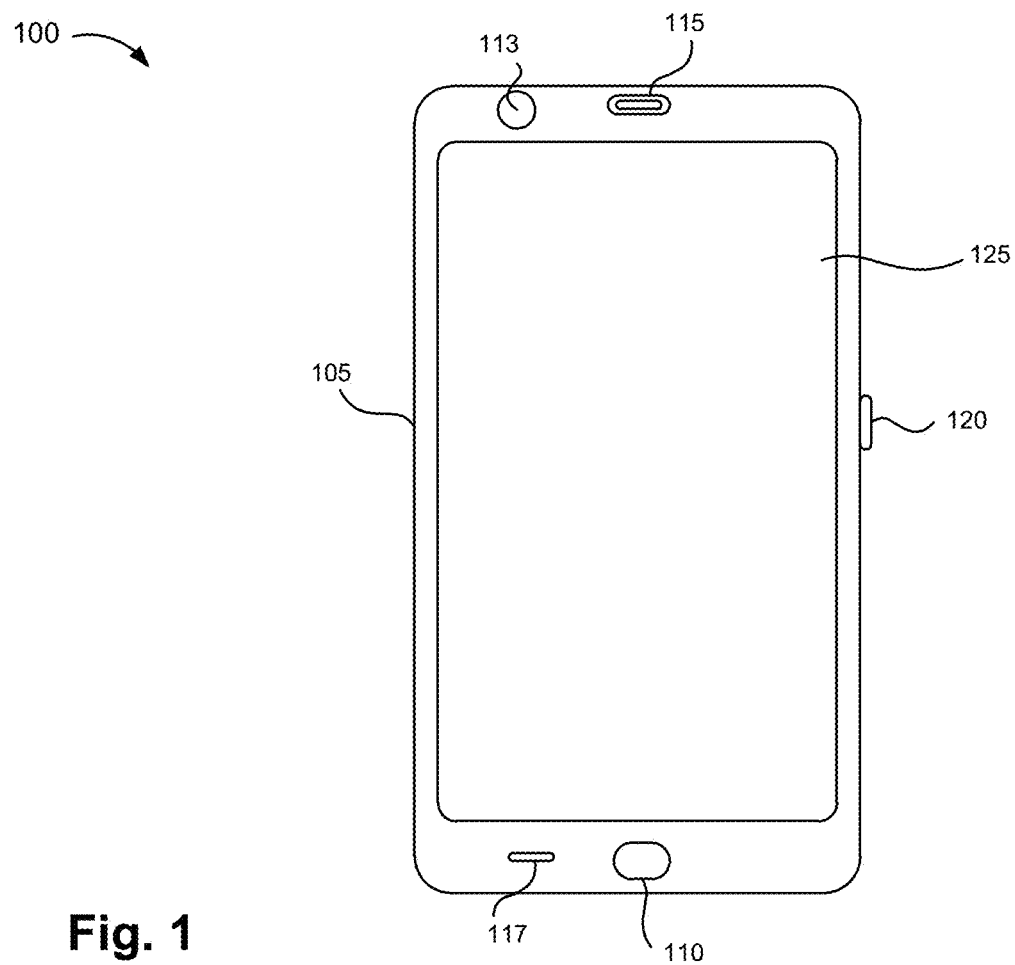
FIG. 1 is a diagram illustrating an exemplary user device in which exemplary embodiments of a dynamic authentication service may be implemented.

The following detailed description refers to the accompanying drawings. The same reference numbers in different drawings may identify the same or similar elements.

Various security measures can be used to prevent unauthorized access to a device. For example, many types of mobile devices offer lock screens that require some sort of input (e.g., a password, a personal identification number (PIN), a gesture performed via a display, etc.) from users in order to use the mobile devices. Additionally, or alternatively, a device may use biometric verification measures to authenticate users. For example, the device may provide for voice identification, fingerprint identification, facial identification, eye (e.g., retinal or iris) identification, etc. Biometric technologies may also recognize users based on behavioral characteristics (e.g., characteristics of user's keystrokes, etc.) and/or other forms of identification (e.g., hand geometry, signature, etc.).

Despite these efforts, the security measure may be compromised. For example, when a user unlocks a mobile device in public or other surroundings where another person is nearby, a password, a PIN, or a gesture entered by the user may be observed by another person. Additionally, while there are various unlock mechanisms available (e.g., entering a user credential, Z-lock, a biometric-based security system (e.g., a voice recognizer, a facial recognizer, etc.), etc.), the security measure invariably relies on static data, such as the password or the PIN, or a biometric template pertaining to the user. In this regard, the key to unlock or gain access to the device doesn't change with each locking and unlocking of the device.

According to an exemplary embodiment, a user device provides a dynamic authentication service that governs access and use of the user device. According to an exemplary embodiment, the dynamic authentication service allows the user to register files. According to an exemplary embodiment, the file may be an image (e.g., a photo, a picture, etc.), a video clip (e.g., without audio), an audio and video clip, or an audio clip. Additionally, or alternatively, the file may pertain to aspects of the user's perception, other than visual or auditory, such as tactile, olfactory, etc. For example, the file may provide a particular vibrational pattern or haptic feedback or cause a release of a certain scent. The file may be a single file (e.g., a single picture) or multiple files (e.g., a series of pictures, a video clip and haptic feedback (e.g., in combination), etc.). Additionally, or alternatively, the file may pertain to a single sensory perception or multiple sensory perceptions (e.g., visual, auditory, tactile, etc.).

According to an exemplary embodiment, the dynamic authentication service allows the user to tag a file with a user input. According to an exemplary embodiment, the user input is text input. For example, the text input may be a word, a sentence, a phrase, or a string of letters, symbols, and/or numbers. According to another exemplary embodiment, the user input may be another form of user input, such as touching a display at a particular location, performing a gesture on the display or a touchless display, pressing a button, user speech, a particular orientation of the user device, etc.

According to an exemplary embodiment, the user input is stored as metadata pertaining to the file. For example, since the user may tag the file with any text, the metadata may include any word, phrase, etc., that the user wishes to use. By way of further example, assuming the file is a picture, the metadata may indicate something in the picture (e.g., name of a person, nickname of friend, location of photo, etc.), an attribute of something in the picture (e.g., age of person in the photo, reason for occasion (e.g., birthday party, etc.)), etc. Alternatively, the metadata may indicate something unrelated to the picture. In this way, the user is unbounded to tag the file with any user input that the user is likely to remember when presented with the file.

Subsequent to the user registering files and tagging the files with user inputs, according to an exemplary embodiment, the dynamic authentication service controls the access and use of the user device based on the files and their corresponding user inputs. For example, subsequent to completion of a setup process and activation of the dynamic authentication service, the user is presented with one or more than one of the registered files. The user is then obliged to enter one or multiple user inputs, which when correctly inputted, serve(s) as a verification of the user's identity.

According to an exemplary embodiment, the dynamic authentication service selects and presents the one or multiple files to the user based on a randomized algorithm. For example, a different file or a different series of files may be selected and presented to the user for authentication purposes with each locking and unlocking of the device. The presentation of the file may serve as a mnemonic to the user, which in turn facilitates the user in providing the correct user input that has been tagged or mapped to the file. In this way, the presentation of the file to the user serves as a prompt to the user to provide the registered user input that corresponds to the presented file.

According to an exemplary embodiment, the dynamic authentication service receives the user input while the file is presented to the user. For example, the user may be presented with an audio and visual clip, and the user may enter the phrase "Mike's Birthday Party" while the audio and video clip is playing on the user device. According to another exemplary embodiment, the dynamic authentication service receives the user input after the file is presented to the user. For example, the user may be momentarily presented with a picture of the user and her friend at her friend's house. Thereafter, the user is presented with a map of the United States and the user is to select on the map a location that corresponds to where the picture was taken. The touch location is compared to a stored touch location (i.e., a stored user input). Alternatively, for example, the user is momentarily presented with the picture and thereafter the user enters a phrase.

According to an exemplary embodiment, the dynamic authentication service allows the user to configure a level of security. For example, a low level of security may be configured such that the user has to correctly input a single user input pertaining to a file. Alternatively, a high level of security may be configured such that the user has to correctly input four user inputs pertaining to four different files. For example, a slide show of four images may be presented to the user in which each image requires the user to provide the correct user input. According to such an implementation, the user may increase the level of security based on the number of correctly inputted user inputs.

According to an exemplary embodiment, the dynamic authentication service provides a failsafe in the event that the user is unable to recall the correct user input. For example, the user may configure the dynamic authentication service to revert authentication to a lock screen after a certain number of failed attempts occur. The user may then enter, for example, a PIN or other string (e.g., password, etc.) to gain access and use of the user device.

According to an exemplary embodiment, the dynamic authentication service allows the user to configure other types of user preferences. For example, the dynamic authentication service provides various graphical user interfaces (GUIs) to allow the user to have the dynamic authentication service activated only in certain locations (e.g., work, outside the home, etc.), during certain times of day, when the user device operates in a particular mode (e.g., a work mode, etc.), when the user device remains idle after a certain period of time, etc. Alternatively, the dynamic authentication service may be activated anytime the user device is powered on. Additionally, according to an exemplary embodiment, the dynamic authentication service causes the user device to be in a locked state immediately after boot-up and/or when the user device transitions from an active state to another state (e.g., idle mode, sleep mode, hibernation mode, etc.).

Additionally, according to an exemplary embodiment, the dynamic authentication service provides graphical user interfaces during the setup process and during authentication. For example, during the setup process, the dynamic authentication service provides a graphical user interface to allow the user to select from a gallery of image files, video files, audio files, and video and audio files. Alternatively, the user may select personal files (e.g., images, video clips, a slide show, etc.), which may be stored by the user device. Additionally, for example, during the setup process, the dynamic authentication service provides a graphical user interface to allow the user to select a type of user input (e.g., text, speech, gesture, combinations thereof, etc.) to be used to tag the file, and a graphical user interface to enter the user input. For example, the dynamic authentication service may provide a map to allow the user to enter or select a location, a calendar that allows the user to enter a date and/or time, a keypad to allow the user to enter text, a gallery to select an image, a video clip, etc. Additionally, during authentication (e.g., when the user is presented with the file or files), the dynamic authentication service may provide similar graphical user interfaces as those described in relation to the setup process.

FIG. 1 is a diagram of an exemplary user device 100 in which an exemplary embodiment of a dynamic authentication service may be implemented. While illustratively speaking based on FIG. 1, user device 100 may be representative of, for example, a smartphone, a cellphone, or a personal digital assistant (PDA), user device 100 may be implemented as various other types of user devices. For example, user device 100 may take the form of a tablet device, a data organizer, an imaging capturing device, a video capturing device, a Web-access device, a computer, a palmtop device, a netbook, a gaming device, a location-aware device, a music playing device, or some other type of consumer device (e.g., an automobile, heavy equipment, etc.). Alternatively, user device 100 may be implemented as a non-consumer device, a non-mobile device, or any other form of an electronic device.

Referring to FIG. 1, user device 100 comprises a housing 105, a home button 110, a camera 113, a speaker 115, a microphone 117, a button 120, and a display 125. According to an exemplary embodiment, user device 100 includes the dynamic authentication service, as described herein.

According to other embodiments, user device 100 may comprise fewer components, additional components, different components, and/or a different arrangement of components than those illustrated in FIG. 1 and described herein. For example, user device 100 may include a port (e.g., a headphone port, a Universal Serial Bus (USB) port, a High Definition Multimedia Interface (HDMI) port, or some other type of input port and/or output port, a memory card slot, etc.), a keypad, a keyboard, a biometric system (e.g., a fingerprint reader, etc.), a mouse, etc.

Housing 105 comprises a structure to contain components of user device 100. For example, housing 105 may be formed from plastic, metal, or some other type of material. Housing 105 may support home button 110, camera 113, speaker 115, microphone 117, button 120, and display 125.

Home button 110 includes a button that returns a user to a home screen or a desktop. Camera 113 includes a device that captures images and video. Speaker 115 is capable of transducing an electrical signal to a corresponding sound wave. For example, the user may listen to music or listen to a calling party through speaker 115. Microphone 117 is capable of transducing a sound wave to a corresponding electrical signal. For example, the user may speak into microphone 117 during a telephone call or to execute a voice command. Button 120 provides an input to user device 100. For example, button 120 may provide for the powering on and off of user device 100.

Display 125 operates as an output component. For example, display 125 may comprise a liquid crystal display (LCD), a plasma display panel (PDP), a field emission display (FED), a thin film transistor (TFT) display, or some other type of display technology (e.g., organic LED (OLED), active matrix OLED (AMOLED), etc). Display 125 is capable of displaying text, pictures, video, various images (e.g., icons, objects, etc.). Display 125 may also be capable of providing haptic or tactile feedback. Additionally, display 125 may operate as an input component. For example, display 125 may comprise a touch-sensitive screen. Additionally, or alternatively, display 125 may comprise a touchless screen (e.g., having air-touch, air-gesture capabilities). Display 125 may be implemented using a variety of sensing technologies, such as capacitive sensing, surface acoustic wave sensing, resistive sensing, optical sensing, pressure sensing, infrared sensing, or gesture sensing. In such instances, display 125 may operate as a single-point input device (e.g., capable of sensing a single touch) or a multipoint input device (e.g., capable of sensing multiple touches that occur at the same time).

Figure 2A:
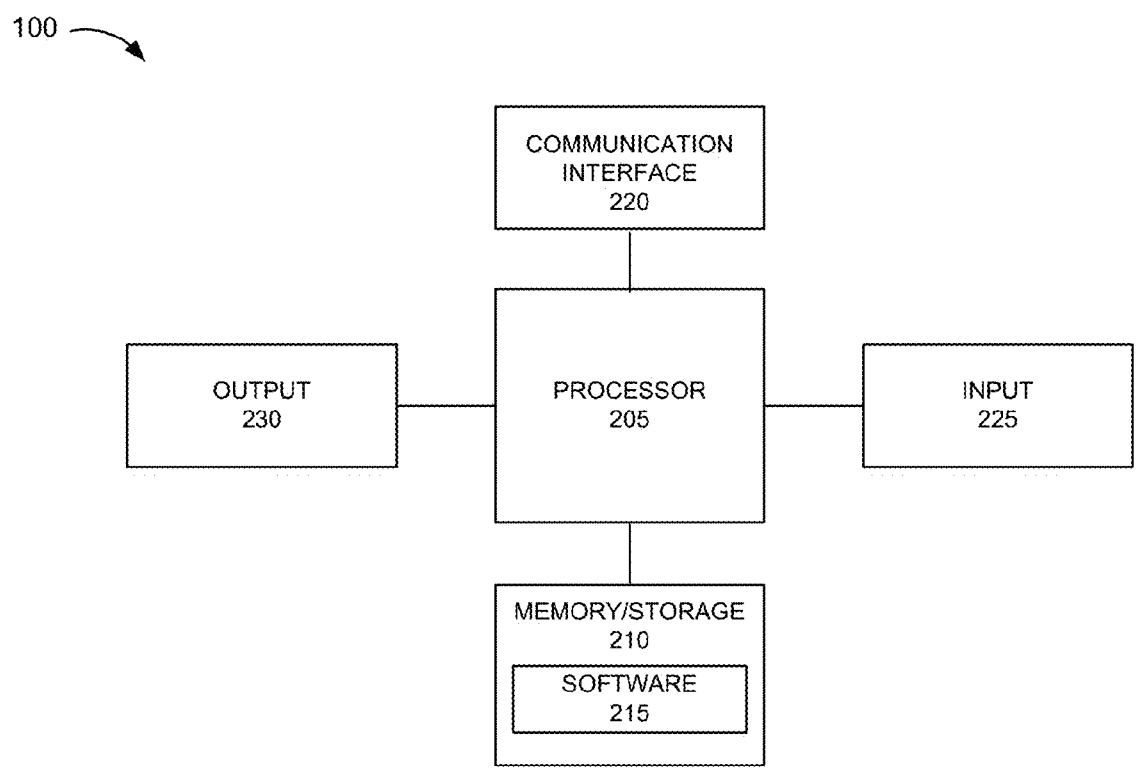
FIG. 2A is a diagram illustrating exemplary components of the user device depicted in FIG. 1.

FIG. 2A is a diagram illustrating exemplary components of user device 100. As illustrated, user device 100 includes a processor 205, a memory/storage 210, software 215, a communication interface 220, an input 225, and an output 230. According to other embodiments, user device 100 may include fewer components, additional components, different components, and/or a different arrangement of components than those illustrated in FIG. 2A and described herein.

Processor 205 includes one or multiple processors, microprocessors, data processors, co-processors, and/or some other type of component that interprets and/or executes instructions and/or data. Processor 205 may be implemented as hardware (e.g., a microprocessor, etc.) or a combination of hardware and software (e.g., a system-on-chip (SoC), an application-specific integrated circuit (ASIC), etc.). Processor 205 performs one or multiple operations based on an operating system and/or various applications or programs (e.g., software 215).

Memory/storage 210 includes one or multiple memories and/or one or multiple other types of storage mediums. For example, memory/storage 210 may include a random access memory (RAM), a dynamic random access memory (DRAM), a cache, a read only memory (ROM), a programmable read only memory (PROM), and/or some other type of memory. Memory/storage 210 may include a hard disk (e.g., a magnetic disk, an optical disk, a magneto-optic disk, a solid state disk, etc.).

Software 215 includes an application or a program that provides a function and/or a process. Software 215 may include firmware. By way of example, software 215 may comprise a telephone application, a multi-media application, an e-mail application, a contacts application, a calendar application, an instant messaging application, a web browsing application, a location-based application (e.g., a Global Positioning System (GPS)-based application, etc.), a camera application, etc. Software 215 includes an operating system (OS). For example, depending on the implementation of user device 100, the operating system may correspond to iOS, Android, Windows Phone, Symbian, or another type of operating system (e.g., proprietary, BlackBerry OS, Windows, Linux, etc.). According to an exemplary embodiment, software 215 includes an application that, when executed, provides the dynamic authentication service, as described herein.

Communication interface 220 permits user device 100 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 operates according to one or multiple protocols, communication standards, and/or the like. Communication interface 220 may also include a Global Positioning System (GPS) receiver and/or other logic to determine the location of user device 100.

Input 225 permits an input into user device 100. For example, input 225 may include a button, a switch, a touch pad, an input port, speech recognition logic, a gyroscope, a compass, an accelerometer, a display (e.g., a touch display, a touchless display), and/or some other type of input component. Output 230 permits an output from user device 100. For example, output 230 may include a speaker, a display, a vibrational mechanism (e.g., haptic feedback, etc.), a chemical emitter (e.g., to emit a scent), a light, an output port, and/or some other type of output component.

User device 100 may perform a process and/or a function in response to processor 205 executing software 215 stored by memory/storage 210. By way of example, instructions may be read into memory/storage 210 from another memory/storage 210 or read into memory/storage 210 from another device via communication interface 220. The instructions stored by memory/storage 210 causes processor 205 to perform the process or the function. Alternatively, user device 100 may perform a process or a function based on the operation of hardware (processor 205, etc.).

Figure 2B:
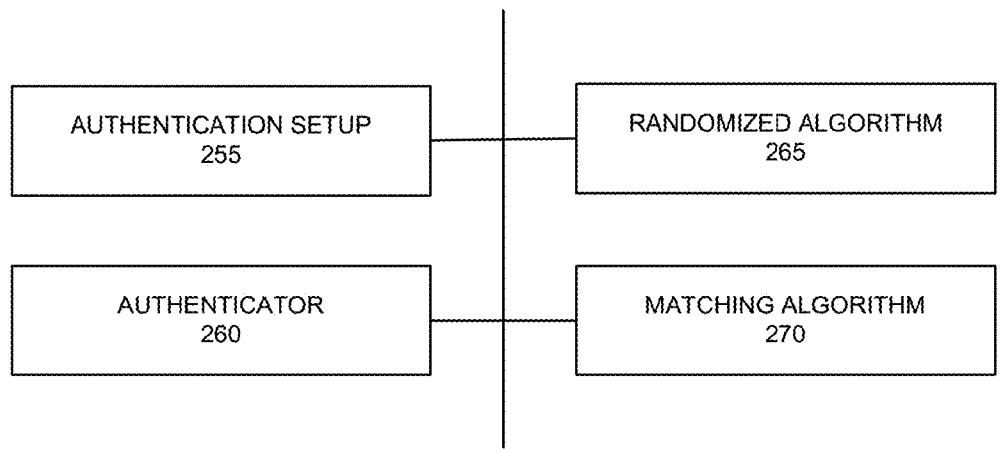
FIG. 2B is a diagram illustrating exemplary functional components of the dynamic authentication service.

FIG. 2B is a diagram illustrating exemplary functional components of an exemplary embodiment of a dynamic authentication system 250. As illustrated, dynamic authentication system 250 includes an authentication setup 255, an authenticator 260, a randomized algorithm 265, and a matching algorithm 270.

According to other embodiments, dynamic authentication system 250 may include additional functional components, fewer functional components, different functional components, and/or a different arrangement of functional components than those illustrated in FIG. 2B and described herein. Further, according to other embodiments, a functional component may be combined with one or more other functional components. Conversely, according to other embodiments, a function described as being performed by a particular component may be performed by another functional component (e.g., a dedicated component not illustrated), by another functional component illustrated, or a combination of multiple functional components. The connections between the functional components are exemplary.

Authentication setup 255 includes logic to set up the dynamic authentication service. Authentication setup 255 provides various user interfaces to allow the user to set up the dynamic authentication service. By way of example, the user may access, via a graphical user interface (GUI), a settings screen, a menu, or select an icon to initiate the setting up of the dynamic authentication service. Thereafter, a setup process may include prompting the user to provide and/or select files. For example, the user may select pictures, audio and video clips, audio clips, video clips, etc., as files. By way of further example, the user may select files from a folder that stores personal pictures taken by the user or on behalf of the user. Alternatively, the user may select from a gallery that stores sample files (e.g., images, haptic feedback files, files that cause the releases of certain scents, audio and video files, etc.) that are available as a part of the dynamic authentication service. The dynamic authentication service will use the selected files to provide the dynamic authentication. For example, randomized algorithm 265 may randomly select from any of the selected files to present to the user during an authentication process.

According to an exemplary embodiment, the user may select one or multiple files to create a mnemonic event. For example, authentication setup 255 may provide a graphical user interface to create a slide show or a series of files to be presented to the user during authentication. Alternatively, for example, authentication setup 255 may provide a graphical user interface to create a combinatorial file that includes multiple files for simultaneous presentment. By way of further example, the user may select an audio and video clip and a file that causes the release of a particular scent and/or cause a particular haptic feedback. In this way, the dynamic authentication service facilitates the user in creating the mnemonic event.

During the setup process, the user is prompted to provide a user input for each file or combination of files. By way of example, during the creation of the mnemonic event, the user enters a user input, which will be stored and mapped to the selected file or files. In this way, when authenticator 260 presents the file(s) to the user for authentication purposes, the user will have to enter the same user input in order to be authenticated. For example, matching algorithm 270 will determine whether the user input matches the stored user input provided during the setup process.

Since during authentication, the dynamic authentication service randomly selects the file for presentment, according to an exemplary embodiment, the dynamic authentication service may require a certain number of file-to-user input mappings to be set up before the dynamic authentication service can be activated. For example, the number of file-to-user input mappings may be a pre-configured value. Alternatively, the number of file-to-user input mappings may be based on a level of security (e.g., a user preference). According to another embodiment, the dynamic authentication service may not impose such a restriction.

Authentication setup 255 may also include logic that allows the user to set preferences pertaining to the dynamic authentication service, such as the level of security, activation parameters (e.g., location, time of day, mode of user device 100, etc.), number of failed attempts before use of default lock screen, set and store and default PIN, password, or other user input for the default lock screen, etc., as described herein. Authentication setup 255 may provide various user interfaces to allow the user to set user preferences. Additionally, authentication setup 255 may store the files and user inputs into a database or a data structure. The database or the data structure may be accessible to various functional components of dynamic authentication service 250.

Authenticator 260 includes logic that controls the dynamic authentication service. For example, authenticator 260 may call, invoke, and/or communicate with other functional components of dynamic authentication service 255 and/or other components of user device 100. According to an exemplary embodiment, assuming the user has completed the setup process and subsequent to boot-up of user device 100, authenticator 260 determines whether to activate the dynamic authentication service. For example, depending on any user preferences (e.g., mode of user device 100, location, date and/or time of day, etc.), authenticator 260 determines whether to activate the dynamic authentication service. For description purposes, assume that authenticator 260 determines to activate the dynamic authentication service.

Based on a determination to activate or provide dynamic authentication, authenticator 260 presents a file or a series of files to the user. The selection of the file or the series of files is based on the logic of randomized algorithm 265. Authenticator 260 may communicate with other components of user device 100 (e.g., a vibrational mechanism, a speaker, a chemical emitter, etc.) to allow for the presentment of the mnemonic event and/or invoke various software 215 (e.g., a media player, a chemical releaser, etc.). For example, assume that the file is a picture, an audio clip, a video clip, or an audio and video clip. Authenticator 260 presents the file via a graphical user interface. According to an exemplary implementation, the graphical user interface includes a virtual keypad that allows the user to enter the user input tagged to the selected file. According to other implementations, authenticator 260 presents the file, and subsequent to the presentation of the file, presents another graphical user interface, which is configured to receive the user's user input. According to yet other exemplary implementations, the user may enter the user input via other mechanisms, such as via button 110 or button 120, speech via microphone 117, a user input via display 125, etc., in which authenticator 260 may or may not present a graphical user interface via which the user enters the user input.

When a user input is received, matching algorithm 270 performs operations, as described herein. For example, matching algorithm 270 compares the user input with a stored user input template. For example, matching algorithm 270 may use the database or the data structure to select the stored user input template and compare the stored user input template to the currently received user input. When a match exists, the user is authenticated and the user is given further access and use of user device 100. When a match does not exist, the user is not authenticated. According to such circumstances, authenticator 260 may present another file. For example, a user setting may allot for a certain number of failed attempts. Alternatively, authenticator 260 may present a default screen (e.g., a lock screen) via which the user is prompted to enter a PIN, a password, or some other type of user input. The default screen may not present a file.

Randomized algorithm 265 includes logic to randomly select one or multiple files for presentation to the user. For example, randomized algorithm 265 randomly selects registered files (e.g., mnemonic events) that may be stored or referenced in the database or the data structure. According to an exemplary embodiment, randomized algorithm 265 selects the number of files based on a user setting. For example, the user may store a user preference that indicates a level of authentication or a level of security. Based on the level of authentication or the level of security, randomized algorithm 265 may randomly select one file or multiple files. By way of further example, a low level of authentication may indicate to randomized algorithm 265 to select a single file or two files, while a medium level or a high level of authentication may indicate to randomized algorithm 265 to select three or more files. Randomized algorithm 265 may include logic to automatically increase the number of files, relative to an initial number of files indicative of a particular level of security, when an incorrect user input is received. Alternatively, randomized algorithm 265 may not perform such a task.

Matching algorithm 270 includes logic to compare a stored user input template or signature against a candidate user input obtained from the user when the dynamic authentication service is activated. As previously described, the stored user input template is obtained from the user during the setup process of the dynamic authentication service. Based on the comparison between the user input template and the candidate user input, matching algorithm 270 determines whether a match exists. When a match exists, the user is verified or authenticated. When a match does not exist, the user is not verified or authenticated. Matching algorithm 270 may cause the user to be granted or denied usage and/or access of user device 100 based on a result of the comparison. Matching algorithm 270 may include logic to compare one or multiple types of user inputs. For example, matching algorithm 270 may compare a text-based input (e.g. a string including a character, a symbol, and/or a number, etc.), an input received via a graphical user interface or a button, a vocal input, a gesture, etc., with a stored user input template.

Although dynamic authentication system 250 has been described in which particular functions are performed by a particular functional component, according to other embodiments, the particular function may be performed by another functional component of dynamic authentication system 250 or a combination of functional components.

Figure 3A:
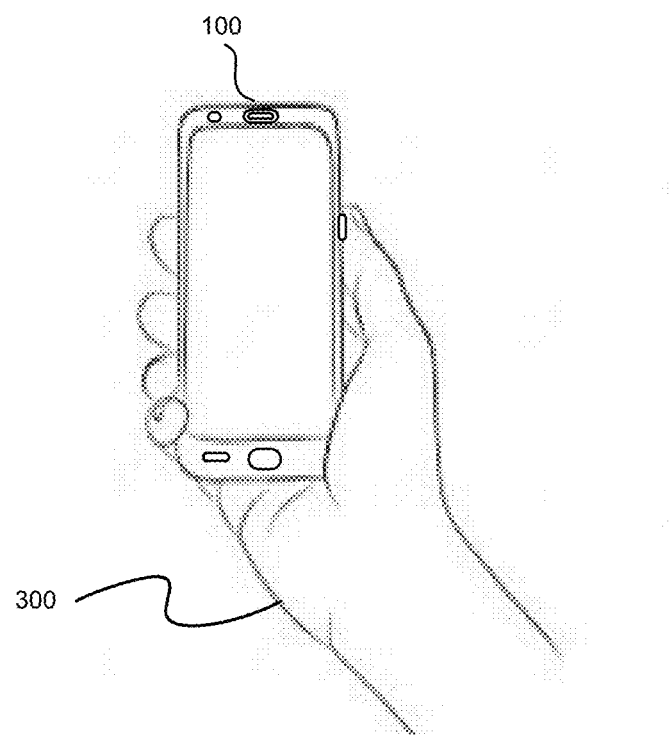
FIGS. 3A-3F are diagrams illustrating an exemplary user scenario pertaining to an embodiment of the dynamic authentication service.

FIGS. 3A-3F are diagrams illustrating an exemplary user scenario pertaining to an embodiment of the dynamic authentication service. Referring to FIG. 3A, assume a user 300 is holding user device 100 in his or her hand. During this time, user 300 decides to go through a setup process for the dynamic authentication service. User 300 selects an icon or accesses a menu (not illustrated) to initiate the setup process. Authentication setup 255 may provide the exemplary graphical user interfaces described further below to allow user 300 to setup the dynamic authentication service.

Figure 3B:
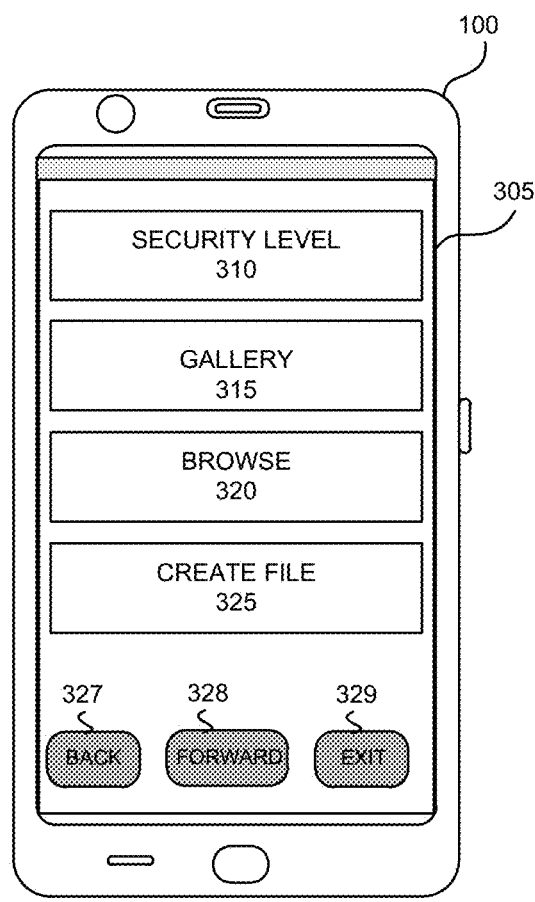

Referring to FIG. 3B, subsequent to initiating the setup process, user 300 is presented with a graphical user interface 305. As illustrated, graphical user interface 305 includes a security level button 310, a gallery button 315, a browse button 320, and a create button 325. Additionally, graphical user interface 305 includes a "back" button 327, a "forward" button 328, and an "exit" button 329, that permits user 300 to navigate through the setup process.

When selected, security level button 310 provides a graphical user interface (not illustrated) that allows user 300 to set the security level for the dynamic authentication service. By way of example, the graphical user interface may permit user 300 to select from a set of different security levels (e.g., a low level, a medium level, and a high level). According to an exemplary implementation, each level may have particular settings pertaining to the dynamic authentication service, such as a minimum number of registered files and user input mappings, a minimum number of user inputs correctly answered before the user is authenticated, a minimum number of files presented to the user, etc. According to other implementations, user 300 may configure various parameters pertaining to a particular security level.

When selected, gallery button 315 provides a graphical user interface (not illustrated) that allows user 300 to select from various pre-stored files. For example, dynamic authentication service 250 may offer sample files, for various types of files (e.g., audio files, audio and visual files, etc.), as previously described, from which user 300 may select to create a mnemonic event.

When selected, browse button 320 provides a graphical user interface (not illustrated) that allows user 300 to search and select from personal files stored on user device 100. For example, user 300 may search and/or navigate to a particular folder used by user 300 to store pictures, audio clips, video clips, etc.

When selected, create file button 325 provides a graphical user interface (not illustrated) to create a file. For example, the graphical user interface may allow user 300 to take a picture or capture an audio/visual clip of his or her current surroundings. For example, the user 300 may take a "selfie." Additionally, the graphical user interface may allow user 300 to create a mnemonic event by combining files. For example, the graphical user interface may allow user 300 to select a video clip and an audio clip of user 300's favorite song. By way of further example, the graphical user interface may include a drag-and-drop interface that allows the user to select various files and combine them so as to create the mnemonic event. The graphical user interface may also include options pertaining to the presenting of the mnemonic event. For example, an audio clip and a video clip may be presented simultaneously. Alternatively, an audio clip may be presented first and after completion, a picture may be presented.

Figure 3C:
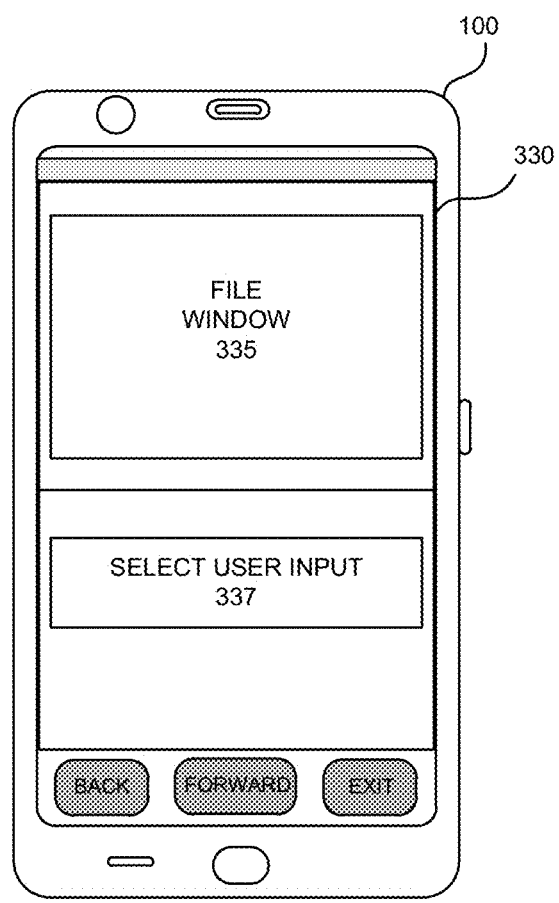

Referring to FIG. 3C, subsequent to the selection of a file or a creation of the mnemonic event, user 300 is presented with a graphical user interface 330. As illustrated, graphical user interface 330 includes a file window 335. For example, when a visual-based file and/or an audio-based file (e.g., a picture, an audio clip, a video clip, a slide show, an audio and video clip, etc.) is selected, file window 335 presents and/or plays the file. For example, file window 335 may include a media player. In this way, the file(s) are presented to user 300. As further illustrated, graphical user interface 330 includes a select user input 337, which when selected, provides a graphical user interface (not illustrated) to allow user 300 to select the type of user input. For example, the graphical user interface may permit user 300 to select from a set of user inputs, such as a textual input, a gesture input, a vocal input, etc., as previously described.

Figure 3D:
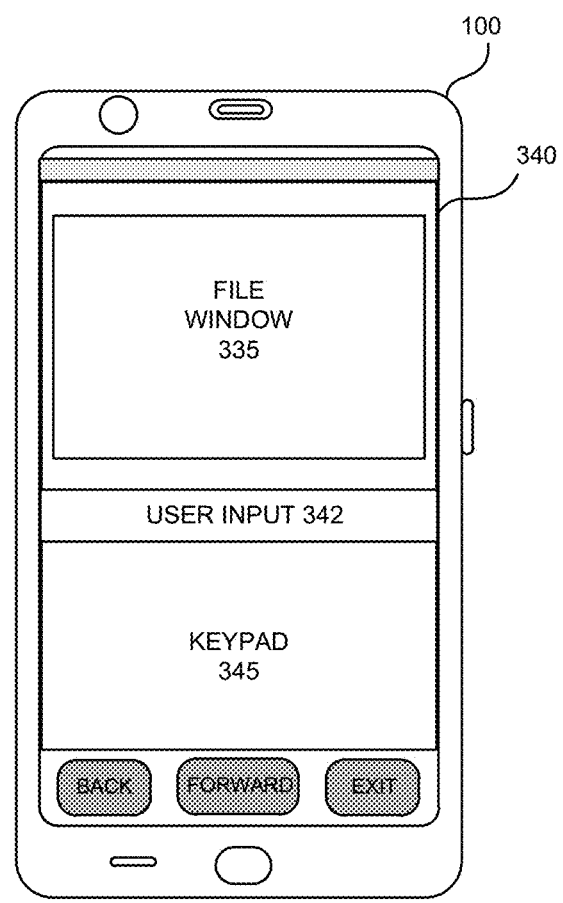
Figure 3E:
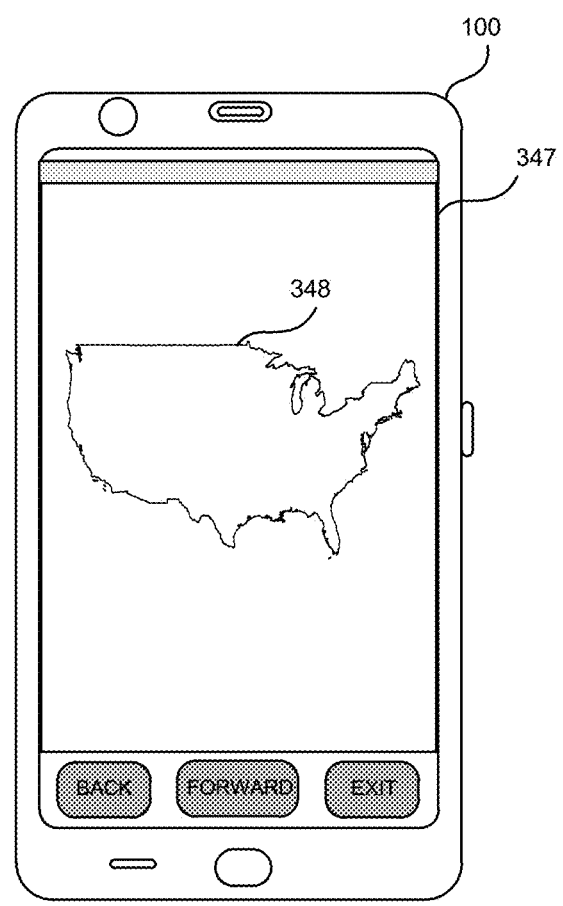

Referring to FIG. 3D, assume that user 300 selected a textual input. As illustrated, a graphical user interface 340 includes file window 335, which can present or play the registered file. Additionally, graphical user interface 340 includes a user input field 342, which user 300 can enter a textual input for the file, such as a word, a phrase, etc. Additionally, graphical user interface 340 provides a keypad 345. For example, keypad 345 may be a virtual or soft key keyboard. According to another example, referring to FIG. 3E, assume that user 300 selected from a set of type of user inputs offered by the dynamic authentication service. For example, the set of type of user inputs may include location pertaining to an image, a color pertaining to the image, a date and a time pertaining to the image, etc. Based on the selection of a particular type of user input, a graphical user interface may be presented to user 300, subsequently or concurrently with the presentment of the file, which allows user 300 to select or enter an input that corresponds to the type of user input. For example, when the type of user input is a location, a graphical user interface 347 may be presented to user 300, subsequently or concurrently with the presentment of the file, that allows user 300 to select a location on a map 348 of the United States. User 300's selection of a location on map 348 may be used as a tag for the file presented. For example, the location on map 348 may be stored as state and/or city, or a particular location on display 125 (e.g., x and y coordinates). Alternatively, graphical user interface 347 may present other types of user interfaces (not illustrated), such as a calendar, which allows user 300 to select a date and/or time, when the particular type of user input is date and time pertaining to the file. In this regard, graphical user interface 347 may be implemented to allow user 300 to select any number and/or kind of user inputs, such as a color from a color wheel, an image (e.g., of a favorite animal, actor, artist, etc.), etc., that user 300 may associate with the mnemonic event (e.g., the file). However, according to such an embodiment, user 300 is provided with information. That is, for example, referring to FIG. 3E and map 348, after presentment of a file, user 300 is provided with information (e.g., the user input is a location) by way of graphical user interface 347 that include map 348. According to other embodiments, the dynamic authentication service provides no information as to the type of user input that is tagged to the file. For example, user device 100 may present an image and wait for a particular word to be spoken by user 300 and for user 300 to tilt user device 100 at a certain orientation, without providing any indication of what the user input should be.

Figure 3F:
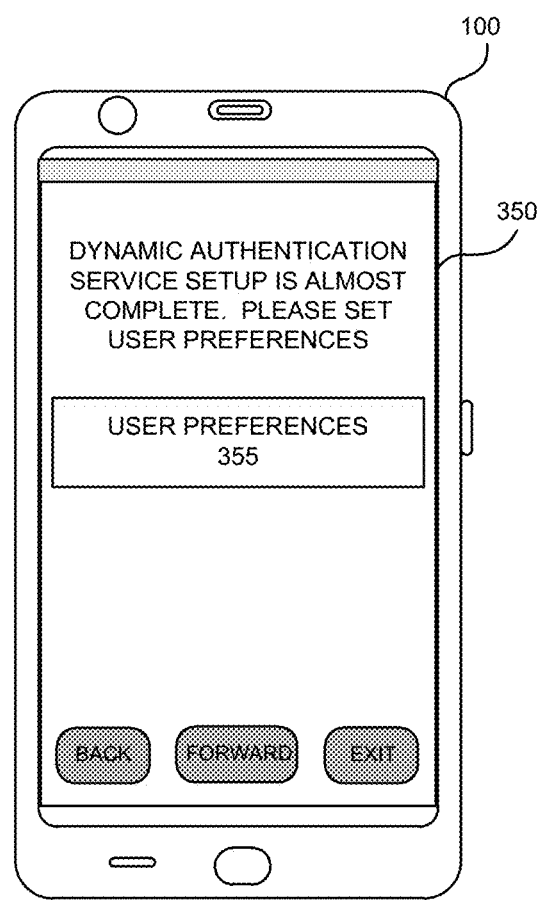

Referring to FIG. 3F, subsequent to registering files and user inputs, user 300 is presented with a graphical user interface 350 that allows user 300 to set various user preferences via user preferences button 355, as previously described.

When user device 100 is in a locked state (e.g., after boot-up or when user device 100 transitions from an active state to another state), authenticator 260 may present graphical user interfaces similar to those previously described. For example, user 300 may be presented with graphical user interface 330, graphical user interface 340, and/or graphical user interface 347. In this way, user 300 is presented the file (e.g., mnemonic event) and user 300 may input the user input so as to gain access and use of user device 100. This process may occur for each locking that may occur subsequent to boot-up.

While FIGS. 3A-3F illustrate an exemplary user scenario pertaining to an embodiment of the dynamic authentication service, which includes exemplary graphical user interfaces, according to other embodiments, the setup process and/or the authentication process may include additional, different, or fewer steps or acts. Additionally, the graphical user interfaces illustrated in FIGS. 3A-3F are purely exemplary.

Figure 4:
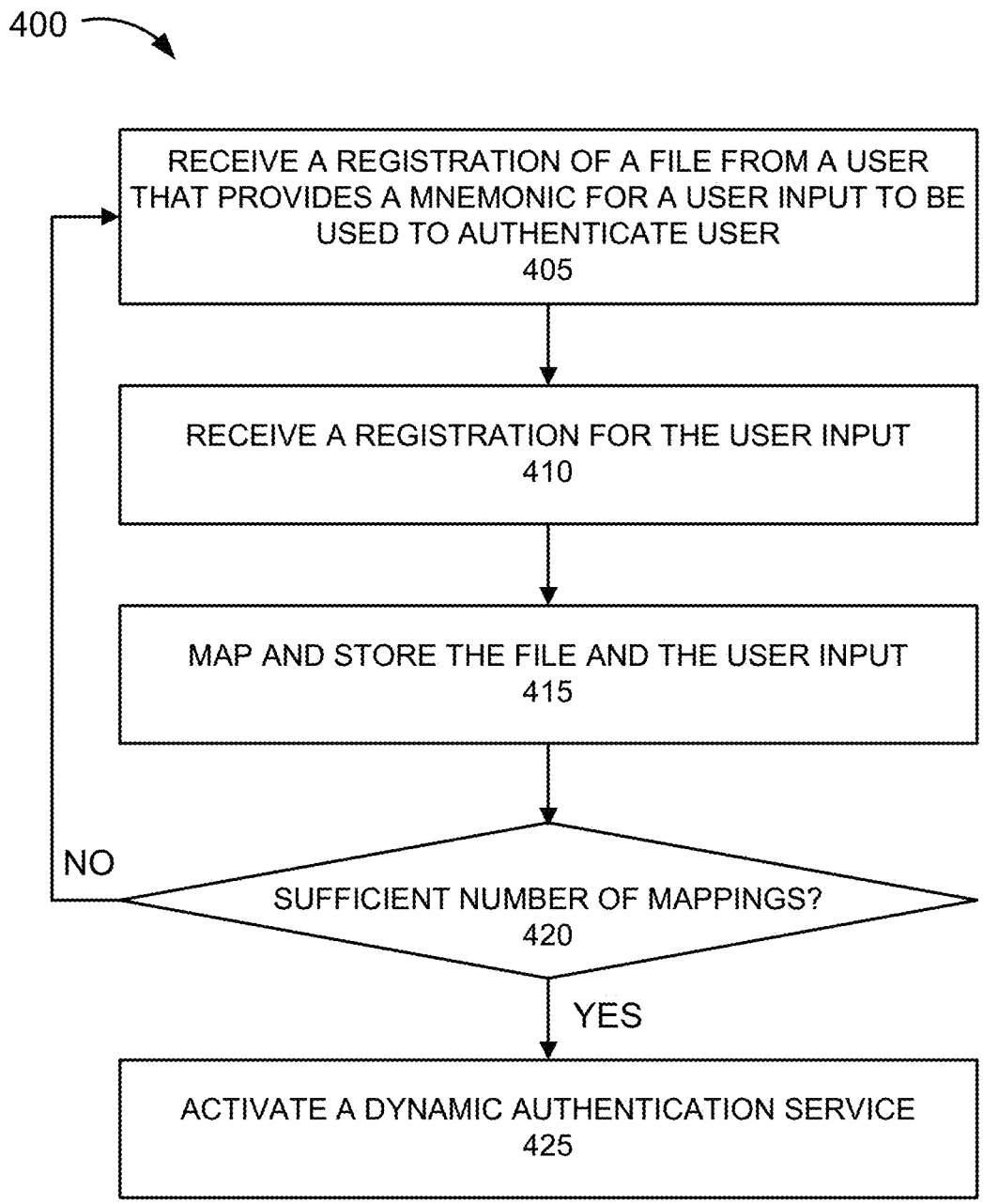
FIG. 4 is a flow diagram illustrating an exemplary process of the dynamic authentication service.

FIG. 4 is a flow diagram illustrating an exemplary process 400 to provide a dynamic authentication service. Process 400 is directed to a process previously described above with respect to FIGS. 3A-3F, as well as elsewhere in this description, in which a user registers files and user inputs during a setup process for the dynamic authentication service. A step or an act described in process 400 may be performed by one or multiple components of user device 100. For example, processor 205 may execute software 215 to perform the step or the act described and/or a functional element of dynamic authentication system 250 performs the step or the act described.

Referring to FIG. 4, in block 405, a registration of a file from a user is received that provides a mnemonic for a user input used to authenticate the user. For example, user device 100 receives a registration of a file from a user. By way of example, the user may register an image, a slide show, an audio clip, a video clip, an audio and video clip, a haptic feedback file, a file that causes a release of a certain scent, etc.

In block 410, a registration of a user input is received. For example, user device 100 receives a registration of a user input from the user. By way of example, the user may register text, a gesture, pressing a button (e.g., once or a pattern of pressing), user speech, orientation of user device 100, and/or other form of user input.

In block 415, the file and the user input is mapped and stored. For example, user device 100 tags the user input to the file. By way of example, the user input is stored as metadata. Additionally, or alternatively, the file or a referent of the file and the user input is stored in a database or a data structure. For example, the file or the referent and the user input are mapped together.

In block 420, it is determined whether a sufficient number of mappings are registered. For example, user device 100 determines whether the user has registered a sufficient number of mappings to provide the dynamic authentication service. For example, since the dynamic authentication service may randomly select the file for presentment, the dynamic authentication service compares the number of registered file-to-user input mappings to a threshold value.

When it is determined that there is a sufficient number of mappings registered (block 420—YES), the dynamic authentication service is activated (block 425). For example, the dynamic authentication service is activated on user device 100, which manages access and use of user device 100.

When it is determined that there is not a sufficient number of mappings registered (block 420—NO), process 400 returns to block 405. For example, user device 100 provides a prompt, via a graphical user interface, that informs the user to register another file-to-user input mapping.

Although FIG. 4 illustrates an exemplary process 400, according to other embodiments, process 400 may include additional operations, fewer operations, and/or different operations than those illustrated in FIG. 4, and as described. For example, according to other embodiments, block 420 may be omitted. Additionally, or alternatively, process 400 may include receiving user preferences from the user, as well as other steps or acts previously set forth in this description. Additionally, according to an exemplary embodiment, the user may register more than one user input for a particular mnemonic event. By way of example, assume the user is presented with a photo of a loved one (e.g., wife, husband, child, etc.). The user may register multiple photos, separately, each of them constitute a user input. For example, when the user is presented with a photo of just his wife, the user may select multiple photos that include the user and his wife. In this way, when the user is presented with a mnemonic event, the user may have available multiple correct answers. In some cases, such an approach may reduce the level of security since multiple correct answers exists. However, the user is also afforded more latitude in recalling a correct user input. This approach is quite distinctive from other approach in which a challenge question may be presented to the user and only a single answer is deemed correct.

Figure 5:
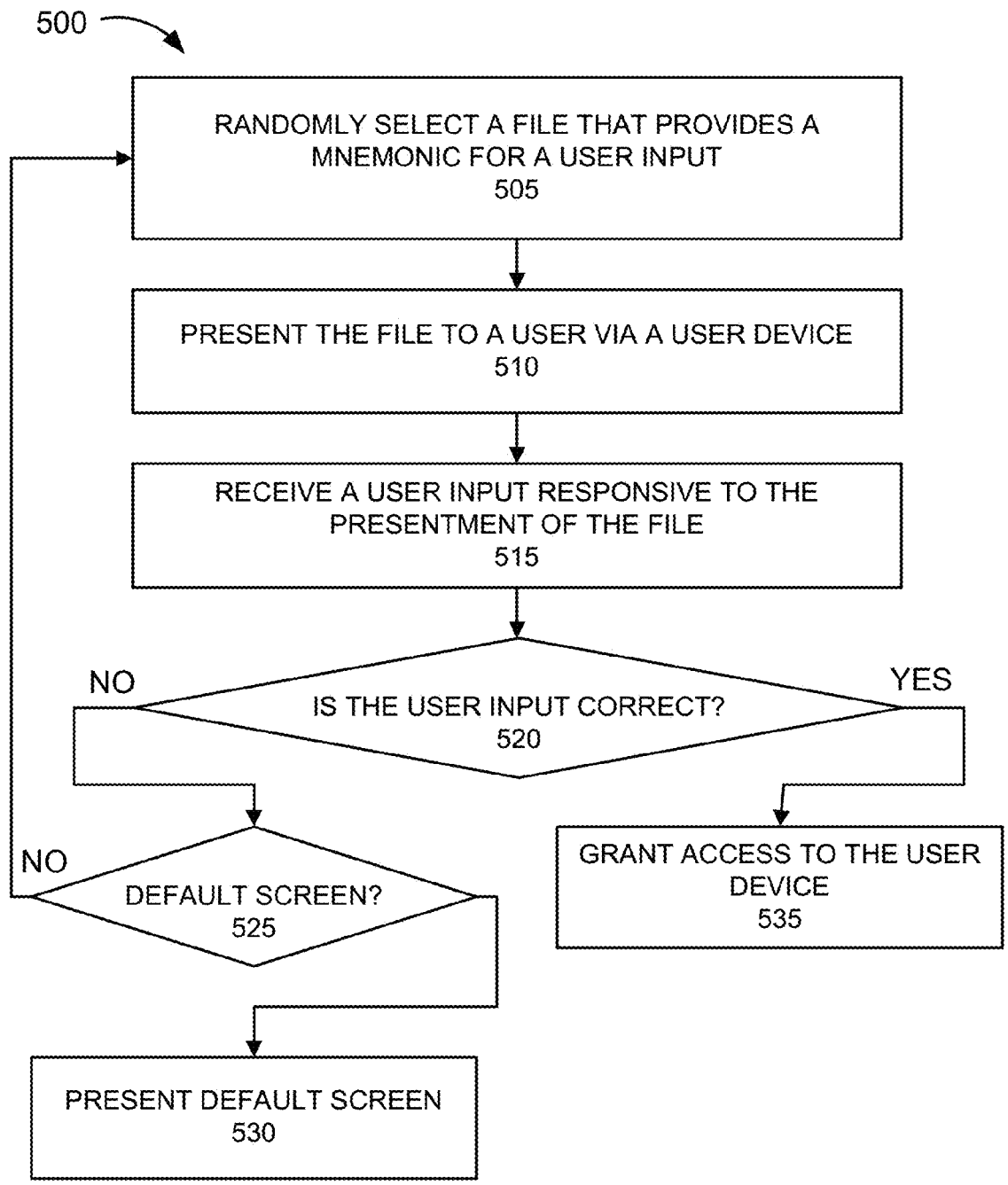
FIG. 5 is a flow diagram illustrating another exemplary process of the dynamic authentication service.

FIG. 5 is a flow diagram illustrating another exemplary process 500 to provide a dynamic authentication service. Process 500 is directed to a process previously described above with respect to FIGS. 3C-3E, as well as elsewhere in this description, in which the dynamic authentication service authenticates the user based on randomly selecting a registered file and receiving a user input. A step or an act described in process 500 may be performed by one or multiple components of user device 100. For example, processor 205 may execute software 215 to perform the step or the act described and/or a functional element of dynamic authentication system 250 performs the step or the act described.

Referring to FIG. 5, in block 505, a file that provides a mnemonic for a user input is randomly selected from multiple registered files. For example, user device 100 randomly selects a file, which has been previously registered by a user that provides a mnemonic for a user input. By way of example, the file may be an image file, an audio clip, an audio and video clip, a video clip, a haptic feedback file, a file that causes a release of a certain scent, etc.

In block 510, the file is presented to a user of a user device. For example, user device 100 presents the file to the user. For example, user device 100 may display an image, play the audio clip, the video clip, or audio and video clip, provide the haptic feedback, or release a chemical that provides a scent.

In block 515, a user input is received that is responsive to the presentment of the file. For example, the user provides the user input via user device 100. The user input may be text, a gesture, pressing a button (e.g., once or a pattern of pressing), user speech, orientation of user device 100, and/or other form of user input.

In block 520, it is determined whether the user input is correct. For example, user device 100 compares the user input to a user input template that is mapped to the file. Based on the comparison, user device 100 determines whether the user input matches the user input template. When it is determined that the user input is not correct (block 520—NO), it is determined whether a default screen is to be presented to the user (block 525). For example, user device 100 determines whether a default screen (e.g., a lock screen) should be displayed to the user based on a number of incorrect user inputs or failed attempts received at that time. By way of example, the number of failed attempts may be a pre-configured number of the dynamic authentication service, or a user preference set by the user. When it is determined that the default screen is not to be presented to the user (block 525—NO), process 500 continues to block 505. For example, user device 100 randomly selects another file.

When it is determined that the default screen is to be presented to the user (block 525—YES), the default screen is presented to the user (block 530). For example, user device 100 presents to the user a default screen. The user then may enter a default PIN, password, or other user input. Thereafter, user device 100 compares the default PIN, etc., to a previously stored default PIN, etc. If a match exists, the user is authenticated and granted access and use of user device 100. If a match does not exist, the user is not authenticated and access and use of user device 100 is prevented.

When it is determined that the user input is correct (block 520—YES), the user is granted access to the user device (block 535). For example, user device 100 validates the user's identity, and access and use of user device 100 is granted.

Although FIG. 5 illustrates an exemplary process 500, according to other embodiments, process 400 may include additional operations, fewer operations, and/or different operations than those illustrated in FIG. 5, and as described. For example, according to other embodiments, block 520 may be omitted, and when the user input is incorrect, the user may be denied access to user device 100 or process 500 continues to block 505. Additionally, according to other embodiments, the user may be presented with a series of files in which process 500 may loop from block 505 through block 520 more than once before access to user device 100 is granted. Additionally, other alterations to process 500 may be performed in accordance with steps or acts previously set forth in this description.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4 and 5, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 205, a dedicated processor (not illustrated), etc.) or a combination of hardware and software (e.g., software 215). The embodiments have been described without reference to the specific software code since software can be designed to implement the embodiments based on the description herein and the accompanying drawings.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 210.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

No element, act, or instruction described in the present application should be construed as critical or essential to the embodiments described herein unless explicitly described as such.

What is claimed is:

1. A method comprising:

receiving, by a user device and from a user, a first selection of one of multiple security levels;

receiving, by the user device and from the user, a second selection of parameter values that configure the one of the security levels, wherein the parameter values indicate a minimum number of registered files and input mappings that are to be registered, a minimum number of user inputs that are to be correctly answered before the user is authenticated, and a minimum number of files that are to be presented to the user;

receiving, by the user device and from the user, a third selection of one or more files and one or more inputs, wherein the one or more inputs are used as a comparative to subsequently received one or more user inputs;

registering, by the user device, the first selection, the second selection, and the third selection, wherein the registering of the one or more files comprises mapping the one or more files to the one or more inputs;

determining, by the user device, whether the third selection satisfies user configurations of the first selection and the minimum number of registered files and input mappings of the second selection;

randomly selecting, by the user device, one or more of the registered one or more files subsequent to determining that the third selection satisfies the user configurations of the first selection and the minimum number of registered files and input mappings of the second selection;

presenting, by the user device and based on the user configurations of the first selection and the minimum number of files that are to be presented of the second selection, the one or more of the registered one or more files;

receiving, by the user device, one or more user inputs that are responsive to the presenting;

determining, by the user device, whether the one or more user inputs, which are responsive to the presenting, are correct; and granting, by the user device and based on the user configurations of the first selection and the minimum number of user inputs that are to be correctly answered of the second selection, further access and use of the user device based on determining that the one or more user inputs, which are responsive to the presenting, are correct.

2. The method of claim 1, further comprising:

determining, by the user device, whether a threshold number of failed attempts has been reached by the user in response to determining that the one or more user inputs, which are responsive to the presenting, are not correct;

displaying, by the user device, a default lock screen based on determining that the threshold number of failed attempts has been reached; and randomly selecting, by the user device, one or more other of the registered one or more files in response to determining that the threshold number of failed attempts has not been reached.

3. The method of claim 1, wherein determining whether the one or more user inputs, which are responsive to the presenting, are correct further comprises:

determining whether a match exists between the presented one or more of the registered one or more files and the one or more user inputs that are responsive to the presenting, with the registered one or more files and the registered one or more inputs.

4. The method of claim 3, wherein the registered one or more files include at least one of an image, a video clip, an audio clip, or an audio and video clip.

5. The method of claim 1, wherein the registered one or more inputs include at least one of text, a gesture, speech, or a button press, and wherein subsequent to the granting, the randomly selecting and presenting is performed again based on the user device transitioning from an active state to one of a sleep state, a hibernation state, or an idle state.

6. The method of claim 1, wherein one of the registered one or more inputs that is mapped to one of the registered one or more files includes multiple correct inputs of the mapping such that receiving only one of the multiple correct inputs from the user causes the user device to grant access and use of the user device.

7. The method of claim 1, further comprising:

displaying, by the user device, subsequent to presenting the one or more of the registered one or more files, a user interface that allows the user to enter the one or more user inputs that are responsive to the presenting.

8. A user device comprising:

a memory, wherein the memory stores software; and a processor, wherein the processor is configured to execute the software to:

receive from a user, a first selection of one of multiple security levels;

receive from the user, a second selection of parameter values that configure the one of the security levels, wherein the parameter values indicate a minimum number of registered files and input mappings that are to be registered, a minimum number of user inputs that are to be correctly answered before the user is authenticated, and a minimum number of files that are to be presented to the user;

receive from the user, a third selection of one or more files and one or more inputs, wherein the one or more inputs are used as a comparative to subsequently received one or more user inputs;

register the first selection, the second selection, and the third selection, wherein the registration of the one or more files comprises mapping the one or more files to the one or more inputs;

determine whether the third selection satisfies user configurations of the first selection and the minimum number of registered files and input mappings of the second selection;

randomly select one or more of the registered one or more files subsequent to a determination that the third selection satisfies the user configurations of the first selection and the minimum number of registered files and input mappings of the second selection;

present, based on the user configurations of the first selection and the minimum number of files that are to be presented of the second selection, the one or more of the registered one or more files;

receive one or more user inputs that are responsive to the presentment of the one or more of the registered one or more files;

determine whether the one or more user inputs, which are responsive to the presentment, are correct; and grant further access and use of the user device based on a determination that the one or more user inputs, which are responsive to the presentment, are correct, the user configurations of the first selection and the minimum number of user inputs that are to be correctly answered of the second selection, and the user is authenticated.

9. The user device of claim 8, further comprising:

a display, and wherein the processor is further configured to execute the software to:

determine whether a threshold number of failed attempts has been reached by the user in response to a determination that the one or more user inputs, which are responsive to the presentment, are not correct;

present, via the display, a default lock screen based on a determination that the threshold number of failed attempts has been reached; and randomly select one or more other of the registered one or more files in response to a determination that the threshold number of failed attempts has not been reached.

10. The user device of claim 8, wherein when determining whether the one or more user inputs are correct, the processor is further configured to execute the software to:

determine whether a match exists between the presented one or more of the registered one or more files and the one or more user inputs, which are responsive to the presentment, with the registered one or more files and the registered one or more inputs.

11. The user device of claim 8, wherein the registered one or more files include at least one of an image, a video clip, an audio clip, or an audio and video clip.

12. The user device of claim 8, wherein the registered one or more user inputs include at least one of text, a gesture, speech, or a button press.

13. The user device of claim 8, wherein one of the registered one or more inputs that is mapped to one of the registered one or more files includes multiple correct inputs of the mapping such that receiving only one of the multiple correct inputs from the user causes the user device to grant access and use of the user device.

14. The user device of claim 8, wherein the processor is further configured to execute the software to:
provide a graphical user interface that allows the user to enter the first selection, the second selection, and the third selection.

15. The user device of claim 8, further comprising:
a display, and wherein the user device is a mobile device or a non-mobile device.

16. A non-transitory storage medium that stores instructions executable by a processor of a computational device, which when executed, cause the computational device to:
receive from a user, a first selection of one of multiple security levels;
receive from the user, a second selection of parameter values that configure the one of the security levels, wherein the parameter values indicate a minimum number of registered files and input mappings that are to be registered, a minimum number of user inputs that are to be correctly answered before the user is authenticated, and a minimum number of files that are to be presented to the user;
receive from the user, a third selection of one or more files and one or more inputs, wherein the one or more inputs are used as a comparative to subsequently received one or more user inputs;
register the first selection, the second selection, and the third selection, wherein the registration of the one or more files comprises mapping the one or more files to the one or more inputs;
determine whether the third selection satisfies user configurations of the first selection and the minimum number of registered files and input mappings of the second selection;
randomly select one or more of the registered one or more files subsequent to a determination that the third selection satisfies the user configurations of the first selection and the minimum number of registered files and input mappings of the second selection;
present, based on the user configurations of the first selection and the minimum number of files that are to be presented of the second selection, the one or more of the registered one or more files;
receive one or more user inputs that are responsive to the presentment of the one or more of the registered one or more files;
determine whether the one or more user inputs, which are responsive to the presentment, are correct; and
grant further access and use of the computational device based on a determination that the one or more user inputs, which are responsive to the presentment, are correct, the user configurations of the first selection and the minimum number of user inputs that are to be correctly answered of the second selection, and the user is authenticated.

17. The non-transitory storage medium of claim 16, wherein the instructions further comprise instructions to:
determine whether a threshold number of failed attempts has been reached by the user in response to a determination that the one or more user inputs, which are responsive to the presentment, are not correct;
present, via a display of the computational device, a default lock screen based on a determination that the threshold number of failed attempts has been reached; and
randomly select one or more other of the registered one or more files in response to a determination that the threshold number of failed attempts has not been reached.

18. The non-transitory storage medium of claim 16, wherein the registered one or more user inputs include an orientation of the computational device.

19. The non-transitory storage medium of claim 16, wherein the registered one or more files include at least one of an image, a video clip, an audio clip, or an audio and video clip.

20. The non-transitory storage medium of claim 16, wherein one of the registered one or more inputs that is mapped to one of the registered one or more files includes multiple correct inputs of the mapping such that receiving only one of the multiple correct inputs from the user causes the user device to grant access and use of the user device.

* * * * *